Jan. 29, 1952 G. S. LAWSON ET AL 2,583,955
APPARATUS FOR DISTRIBUTING RUBBER IN MOLDS
Filed Jan. 4, 1949 2 SHEETS—SHEET 1
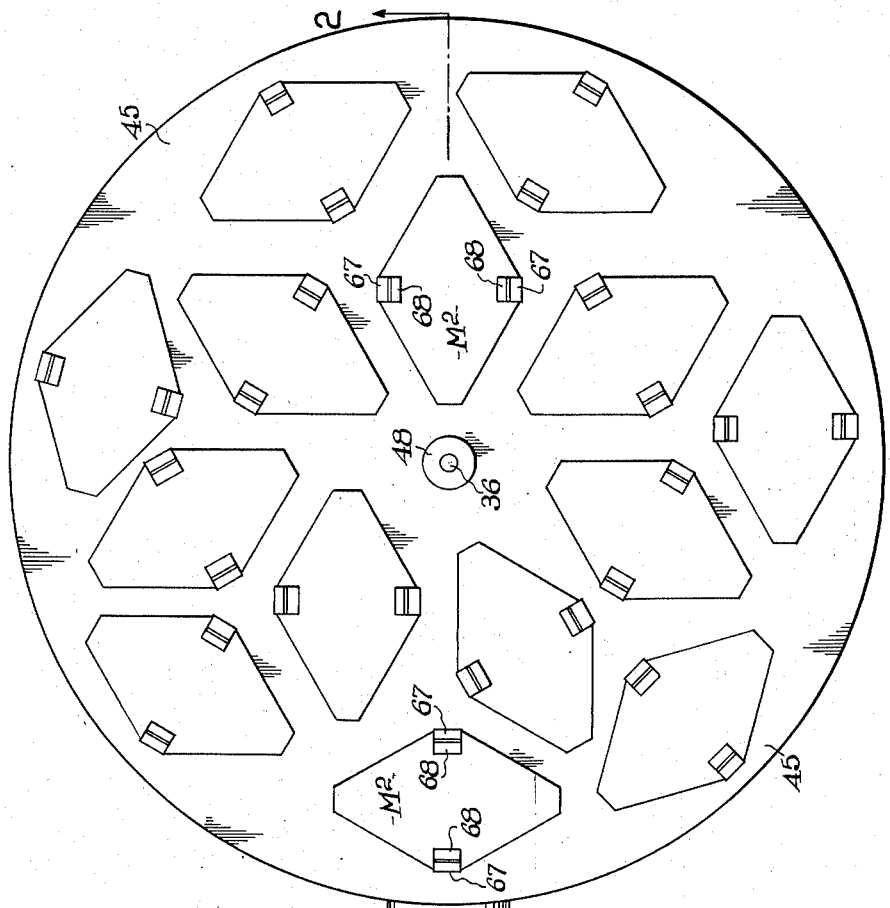
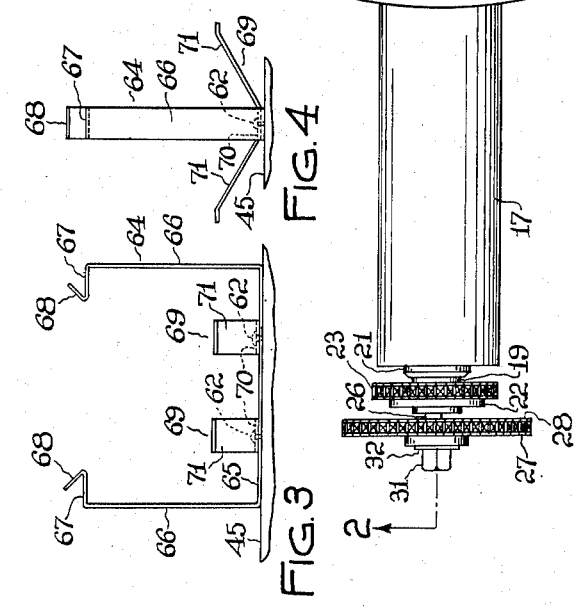
INVENTORS.
GEORGE S. LAWSON
JAMES C. LAWSON
BY
ATTORNEY.

Patented Jan. 29, 1952

2,583,955

UNITED STATES PATENT OFFICE 2,583,955

APPARATUS FOR DISTRIBUTING RUBBER IN MOLDS

George S. Lawson, Perry, and James C. Lawson, Euclid, Ohio, assignors to Future Products, Inc., Cleveland, Ohio, a corporation of Ohio Application January 4, 1949, Serial No. 69,186

14 Claims. (Cl. 18—26)

This invention relates, as indicated, to apparatus for distributing rubber in molds.

A primary object of the invention is to provide apparatus of the character described, which is effective to uniformly and quickly distribute rubber against the mold surfaces in the molding of hollow rubber articles, such, for example, as hollow rubber dolls.

Another object of the invention is to provide apparatus of the character described, through the use of which hollow rubber articles can be made quickly, inexpensively, and in large quantities, from a commercial standpoint.

A further object of the invention is to provide novel mechanism or apparatus for carrying out the aforesaid objects.

A further object of the invention is to provide a novel apparatus of the character described, whereby a substantially universal movement is imparted to the molds, which has the effect of distributing the latex or rubber within the molds evenly over the inner surfaces of the molds.

A further object of the invention is to provide novel means for resiliently supporting the molds during the molding operation, whereby the molds are enabled to withstand shocks imparted thereto, due either to possible impact with extraneous objects or the movements inherent in the molding operation.

A still further object of the invention is to provide novel means for supporting the molds during the molding operation, said means permitting the molds to be quickly and easily mounted for the molding operation, and removed after the molding operation.

Other objects and advantages of my invention will be apparent during the course of the following description.

In the accompanying drawings, forming a part of this specification, and in which like numerals are employed to designate like parts throughout the same, Fig. 1 is a plan view of the apparatus of the present invention, showing the molds mounted thereon;

Fig. 3 is a fragmentary view showing one of the mold supporting and clamping units, and Fig. 4 is an end elevational view of the unit shown in Fig. 3.

Figure 2:
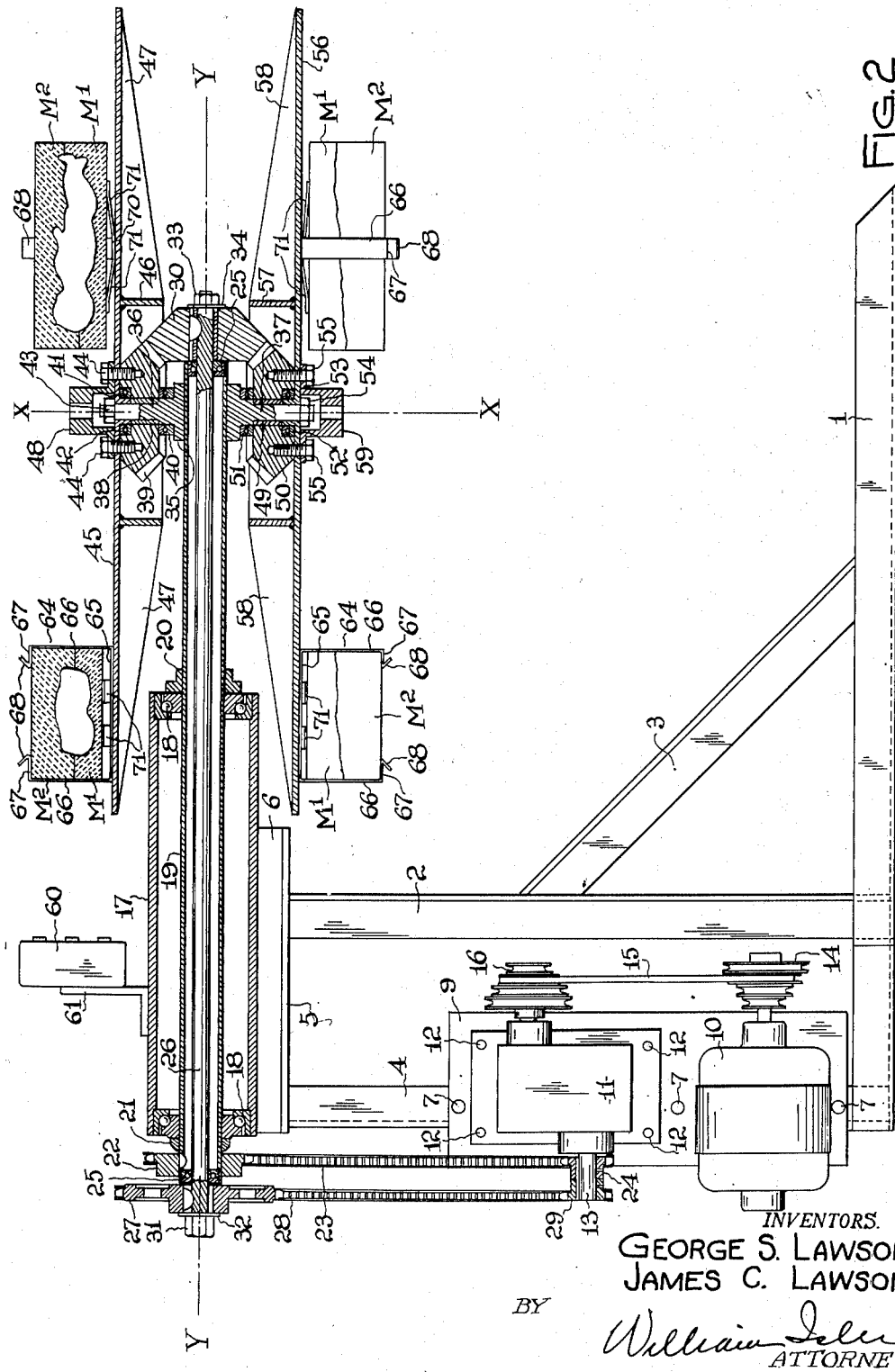
Fig. 2 is a cross-sectional view, taken on the line 2—2 of Fig. 1.

Referring more particularly to the drawings, the apparatus will be seen to comprise a base 1 formed of angle iron, having a pair of angle iron posts or uprights 2 extending perpendicularly to the base, and a pair of gussets 3 extending angularly to the base 1, and uprights 2. Extending upwardly from the base 1, in parallel spaced relation to the uprights 2, is a tubular post 4 of square cross-section.

Extending transversely of the uprights 2 and post 4 is an angle iron member, having a horizontal flange 5 which is welded or otherwise secured to the upper ends of the uprights 2 and post 4, and a vertical flange 6.

Secured to the tubular post 4, as by means of bolts 7, is a rectangular plate 9, upon the lower portion of which a motor 10 is mounted. A gear reducer 11 is secured to the plate 9, above the motor 10, as by means of bolts 12. The gear reducer 11 is provided with a stub shaft 13, which is driven by the motor 10 through the intermediary of a pulley 14, an endless V-belt 15, pulley 16 and the gear reducer 11. The pulleys 14 and 16 are of the stepped type, permitting changes in speed by shifting of the belt 15.

Secured to the vertical flange 6 of the angle iron member 5—6 is a tube 17, the forward end of which overhangs the base 1 and is parallel with the latter. Ball-bearings 18 are mounted in the ends of the tube 17, and a tubular shaft 19 is mounted in the inner races of the bearings 18, so as to rotate with said inner races. The tubular shaft 19 is restrained against axial displacement relatively to the tube 17 by means of a stop collar 20, which is welded to the shaft, and a lock nut 21, which is threadedly secured to the tube 17. The shaft 19 has keyed thereto, adjacent the nut 21, a sprocket 22, which is driven by an endless chain 23, through the medium of a sprocket 24 keyed to the shaft 13 of the reducer 11.

Ball bearings 25 are mounted in the ends of the shaft 19, and a shaft 26 is mounted in the inner races of these bearings, so as to rotate with said inner races. The shaft 26 has keyed thereto, adjacent the sprocket 22, a larger sprocket 27, which is driven by an endless chain 28, through the medium of a sprocket 29 keyed to the shaft 13 of the reducer 11.

The inner end of the shaft 26 has keyed thereto a bevel gear 30. The shaft 26 is maintained against displacement axially relatively to the shaft 19 by means of a nut 31 secured to the outer end of the shaft 26, which bears against a washer 32, which, in turn, bears against the sprocket 27, and a nut 33, secured to the inner end of the shaft 26, which bears against a washer 34, which, in turn, bears against the bevel gear 30.

Welded to the shaft 19, at a point adjacent the inner end of the latter, is an annular collar 35, having stub shafts 36 and 37 extending radially from diametrically opposite points of the collar. The stub shaft 36 is provided with a bushing 38 upon which a bevel gear 39 is mounted for rotation, the gear 39 being in mesh with the gear 30. Rotation of the gear 39 is facilitated by interposition of a thrust bearing 40 between the collar 35 and the inner end face of the gear 39, and by interposition of a similar thrust bearing 41 between the outer end face of the gear 39 and a washer 42 which is secured to the end of the stub shaft 36 by a nut 43.

Secured to the gear 39, as by means of bolts 44, is a circular table 45, which is suitably reinforced, as by means of a tube 46 and gussets 47. A post or cap 48 is provided for covering the nut 43 and end of the shaft 36, and is secured to the table 45 by means of the bolts 44.

The stub shaft 37 is provided with a bushing 49 upon which a bevel gear 50 is mounted for rotation, the gear 50 being in mesh with the gear 30. Rotation of the gear 50 is facilitated by the interposition of a thrust bearing 51 between the collar 35 and the inner end face of the gear 50 and by interposition of a similar thrust bearing 52 between the outer end face of the gear 50 and a washer 53 which is secured to the end of the stub shaft 37 by a nut 54.

Secured to the gear 50, as by means of bolts 55, is a circular table 56, which is suitably reinforced, as by means of a tube 57 and gussets 58. A post or cap 59 is provided for covering the nut 54 and the end of the shaft 37, and is secured to the table 56 by means of the bolts 55.

A switch box 60, through which the motor 10 is controlled, is mounted on a bracket 61, which, in turn, is supported by the tube 17.

Secured to the tables 45 and 56 at spaced points, as by means of bolts 62, are mold clamps 64, each of which is preferably formed from a strip of spring steel bent to provide a flat base portion 65, parallel upright portions 66 and inturned flanges 67 at the upper ends of the upright portions 66. The flanges 67 are rebent to provide inclined portions 68.

Secured to the tables 45 and 56, by means of the bolts 62, are resilient mold supports 69, each of which is preferably formed of spring steel bent to provide flat attaching portions 70 and diverging mold rest portions 71.

The apparatus, as thus described, is designed primarily for the purpose of uniformly distributing liquid latex or rubber in molds used for molding hollow rubber articles, such, for example, as hollow rubber dolls.

The molds, for this purpose, are formed of plaster of Paris, and consist of lower portions $M^1$ and upper portions $M^2$, each portion being hollowed out to form a portion of the doll. The lower portions of each mold are first filled with a predetermined quantity of liquid latex, sufficient in amount to form the entire doll, after which the upper portions of the molds are placed over the lower portions. The molds, as thus assembled, are then inserted in the clamps 64, as by pushing the molds downwardly past the inclined portions 68 of the clamps. These inclined portions facilitate such insertion of the molds, the upright portions 66 of the clamp being spread apart by the mold during such insertion. After the upper portion of the mold has passed the flanges 67, the upright portions 66 of the clamp, due to their inherent resiliency, return to their normal position, causing the flanges 67 to overlie the upper edges of the upper portion of the mold, so that the mold is securely clamped. This clamping action is increased by virtue of the fact that the resilient portions 71 of the mold supports 69 are depressed to some extent by the weight of the molds, thereby causing the flanges 67 of the clamps to bear more tightly against the upper mold portions.

The molds are thus securely clamped to the tables, and yet are resiliently supported by the tables in a manner which enables them to withstand shocks imparted thereto due to possible impact with extraneous objects or to the movements which will now be described. At the same time, the mounting of the molds is such that they can be quickly and easily removed from the tables after the molding operation has been completed.

The operation of the apparatus will now be briefly described.

With the loaded molds mounted on the tables in the manner which has been described, the operator will start the motor 10, causing the shaft 13 of the gear reducer 11 to rotate. This rotation is imparted to the tables 45 and 56, through the intermediary of the sprocket 20, chain 28, sprocket 27, shaft 26, bevel gear 30 and bevel gears 39 and 50. The table 45 is rotated about the axis X—X of the shafts 36 and 37, while the table 56 is simultaneously rotated about the axis X—X in a direction opposite the direction of rotation of the table 45.

Simultaneously, with the rotation of the tables 45 and 56 about the axis X—X, these tables are rotated about the axis Y—Y of the shaft 19, which is at right angles to the axis X—X. This rotation of the tables 45 and 56 about the axis Y—Y is imparted to the tables through the intermediary of the sprocket 24, chain 23, sprocket 22, shaft 19, collar 35 and stub shafts 36 and 37.

The compound movement, which is thus given to the molds, which is, in effect, a universal movement, is effective to cause the rubber or latex within the molds to be uniformly and quickly distributed against the mold surfaces. In this manner, hollow rubber articles, such, for example, as hollow rubber dolls, can be produced quickly, inexpensively, and in large quantities, from a commercial viewpoint.

The molds are resiliently supported during the molding operation, and are thus better enabled to withstand shocks imparted thereto. The manner in which the molds are clamped or supported permits the molds to be quickly and easily mounted for the molding operation, and removed after the molding operation.

While the apparatus has been described particularly with reference to the distribution of rubber in molds, it will be understood that it can be used, with or without slight modifications, for distributing any flowable substance against surfaces of molds, as for example, for distributing flock against mold surfaces which have been treated for permitting the flock to adhere thereto, for distributing pottery clay against porous mold surfaces and for the cold pouring of plastics against surfaces of metal, glass or plastic molds. Moreover, the molds may be made of any desired material, depending upon the nature of the material distributed therein.

It will also be understood that various changes may be made in the apparatus and method, as described, without departing from the scope of the subjoined claims.

Having thus described our invention, we claim:

1. Apparatus for distributing rubber in molds, said apparatus comprising a horizontal drive shaft, a pair of vertically spaced disk-like tables of relatively large diameter, each adapted to support a multiplicity of molds, said tables being rotatable about a common vertical axis, means for rotating one of said tables in one direction about said axis, and means for simultaneously rotating the other table in the opposite direction about said axis.

2. Apparatus, as defined in claim 1, including means for rotating both of said tables about the axis of said drive shaft.

3. Apparatus, as defined in claim 2, including means for resiliently supporting the molds on said tables during rotation thereof.

4. Apparatus, as defined in claim 2, including resilient clamps for resiliently supporting said molds on said tables during rotation thereof.

5. Apparatus for distributing rubber in molds, said apparatus comprising a pair of spaced circular tables, a tubular drive shaft extending between said tables, a second drive shaft extending through said tubular drive shaft, means including gearing driven by said second drive shaft for rotating said tables about a common axis, with one table driven in a direction opposite to that of the other, and means for rotating said tubular drive shaft, whereby said tables are rotated about an axis perpendicular to said common axis.

6. Apparatus, as defined in claim 5, including means for resiliently supporting the molds on said tables during rotation thereof.

7. Apparatus, as defined in claim 5, including resilient clamps for resiliently supporting said molds on said tables during rotation thereof.

8. Apparatus for distributing rubber in molds, said apparatus comprising a tubular drive shaft, stub shafts extending radially from diametrically opposite points of said shaft, bevel gears journalled on said stub shafts, mold supporting tables supported by said bevel gears, a second drive shaft extending through said tubular drive shaft, a bevel gear driven by said second drive shaft and in mesh with both of said first-named bevel gears, means for rotating said tubular drive shaft, and means for rotating said second-named drive shaft.

9. Mold-supporting means comprising a clamp formed of spring steel, bent to provide a flat base portion, parallel upright portions, and inturned flanges at the ends of said upright portions, said flanges having rebent portions inclined to the planes of said upright portions, and resilient means for engaging the base of the mold.

10. Mold-supporting means, as defined in claim 9, in which said last-named means comprises plates having flat base portions and diverging portions adapted to engage the base of the mold.

11. Mold - supporting means comprising a clamp formed of spring steel, bent to provide a base portion, parallel upright portions, inturned flanges at the ends of said upright portions adapted to engage the upper face of a mold, and means for resiliently supporting the base of the mold out of contact with said base portion of the clamp.

12. In combination, a rotatable mold supporting table, mold-supporting means secured to said table, said means comprising a clamp formed of spring steel, bent to provide a flat base portion, parallel upright portions and inturned flanges at the ends of said upright portions, said flanges having rebent portions inclined to the plane of said upright portions, and sectional molds supported by said means, with said inturned flanges bearing against one section of the mold.

13. The combination, as defined in claim 12, in which said means includes resilient arms engaging the base section of the mold.

14. The combination, as defined in claim 12, in which said means comprises plates having flat base portions and diverging portions engaging the base of the mold.

GEORGE S. LAWSON.
JAMES C. LAWSON.

REFERENCES CITED

The following references are of record in the file of this patent:

UNITED STATES PATENTS

| Number | Name | Date |
| --- | --- | --- |
| 1,341,670 | Powell | June 1, 1920 |
| 1,998,897 | Kay | Apr. 23, 1935 |
| 2,042,975 | West | June 2, 1936 |
| 2,060,962 | Twiss | Nov. 17, 1936 |
| 2,433,065 | Rubissow | Dec. 23, 1947 |